United States Patent [19]
Duo

[11] Patent Number: 6,137,455
[45] Date of Patent: Oct. 24, 2000

[54] COMPUTER KEYBOARD, MOUSE AND VGA MONITOR SIGNAL TRANSMISSION ARRANGEMENT

[75] Inventor: Rung-Fu Duo, Hsin-Tien, Taiwan

[73] Assignee: Raritan Computer Taiwan, Inc., Hsin Tien, Taiwan

[21] Appl. No.: 09/177,966

[22] Filed: Oct. 26, 1998

[51] Int. Cl.[7] .................................................. G09G 5/00
[52] U.S. Cl. .............................. 345/2; 345/213; 340/717
[58] Field of Search ........................... 345/2, 22, 26–27, 345/213, 168, 132, 210–214; 340/717, 720, 825.06

[56] References Cited

U.S. PATENT DOCUMENTS

| | | | |
|---|---|---|---|
| 3,925,776 | 12/1975 | Swallow | 340/324 |
| 3,955,188 | 5/1976 | Viswanathan | 340/324 |
| 5,268,676 | 12/1993 | Asprey et al. | 345/2 |

*Primary Examiner*—Vijay Shankar
*Assistant Examiner*—Mansour M. Said
*Attorney, Agent, or Firm*—Bacon & Thomas, PLLC

[57] ABSTRACT

A computer keyboard, mouse and VGA monitor signal transmission arrangement includes an encoder connected to a personal computer, a decoder connected to computer peripheral apparatus including a VGA monitor, a keyboard and a mouse, R.G.B VGA video signal lines and one D signal transmission signal line respectively connected between the encoder and the decoder for signal transmission, wherein horizontal synchronizing and vertical synchronizing signals are encoded and transmitted through one video signal line, keyboard and mouse signals from the personal computer are encoded and transmitted through the other video signal lines; keyboard signals and mouse signal that are to be inputted into the personal computers are transmitted through the D signal transmission signal line.

1 Claim, 6 Drawing Sheets

COMPUTER KEYBOARD, MOUSE AND VGA MONITOR SIGNAL TRANSMISSION ARRANGEMENT

BACKGROUND OF THE INVENTION

The present invention relates to a computer keyboard, mouse and VGA monitor signal transmission arrangement which uses three VGA monitor video signal lines and one added signal line to achieve transmission of computer keyboard, mouse and VGA monitor signals to a remote place, enabling the user to operate the computer from a distance When a personal computer is used, it must be operated under an optimum working environment, and the working area is normally set within a limited area (for example within 20 meters) so as to eliminate electric wiring and signal attenuation problems. However, a complicated electric wiring becomes necessary if a computer must be operated from a distance in certain conditions (for example, the working place is not suitable for installation of a computer). In a regular personal computer system, VGA monitor signals include red, blue, green, horizontal synchronizing, vertical synchronizing, ID . . . total 9 signals (13 signal lines); keyboard signals include CLOCK and DATA; mouse signals include CLOCK and DATA (serial mouse includes three signals, namely, TXD, RXD and RTS). Therefore, there are total 13 signals, and total 17 signal lines are required. It is difficult and expensive to arrange total 17 signals lines for controlling the operation of a personal computer from a distance. Further, because keyboard and mouse (PS/2 mouse) signals are transmitted in two directions, a complicated bi-directional driver is needed. However, it is not easy to obtain a bi-directional driver for use in a long distance (several miles) signal transmission.

SUMMARY OF THE INVENTION

The present invention has been accomplished to provide a computer keyboard, mouse and VGA monitor signal transmission arrangement which eliminates the aforesaid problems. It is one object of the present invention to provide a computer keyboard, mouse and VGA monitor signal transmission arrangement which uses three VGA video signal lines and one transmission signal line as means for transmission of computer keyboard, mouse and VGA monitor signals, enabling a computer user to operate a computer stably from a distance without causing any signal interference among keyboard signals, mouse signals and video signals. It is another object of the present invention to provide a computer keyboard, mouse and VGA monitor signal transmission arrangement which greatly minimizes the arrangement of electric cables and reduces the installation cost of the computer system.

DETAILED DESCRIPTION OF THE PREFERRED EMBODIMENT

Figure 1:
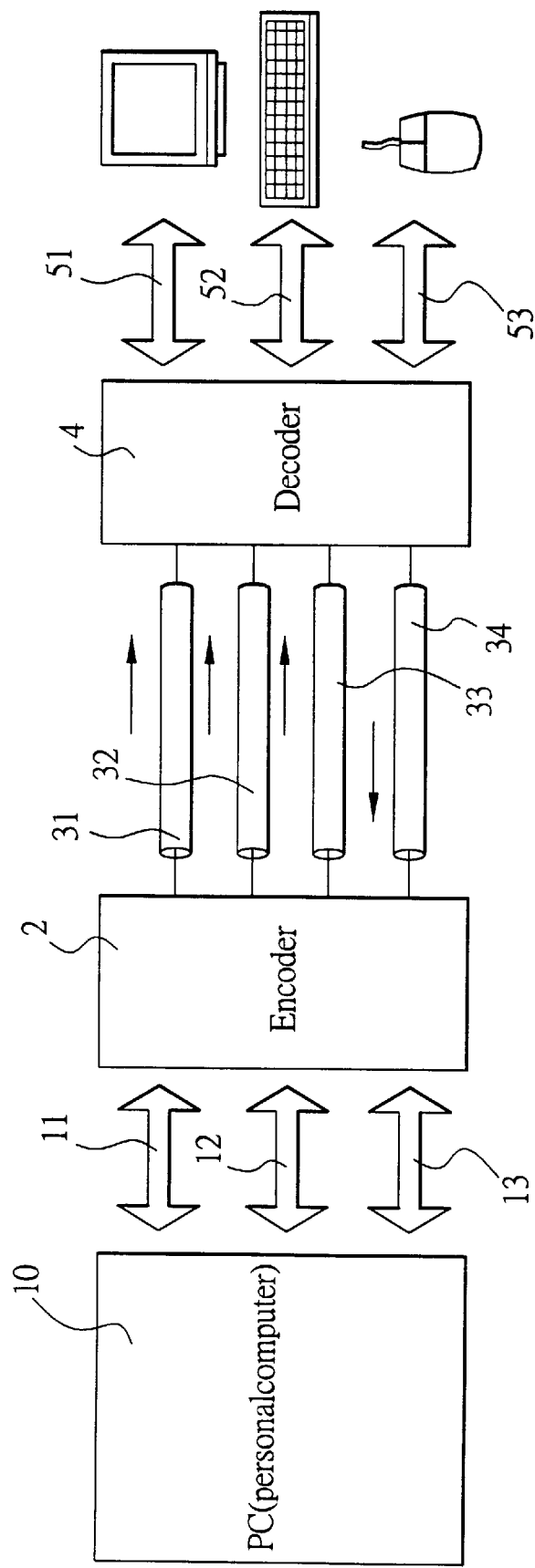
FIG. 1 is a schematic drawing explaining the transmission arrangement of the present invention.

Referring to FIG. 1, a computer keyboard, mouse and VGA monitor signal transmission arrangement in accordance with the present invention is generally comprised of an encoder 2, a set of signal lines 31~34, and a decoder 4.

The input end of the encoder 2 is connected to the mainframe of a personal computer 10 to receive VGA monitor signals, keyboard signals and mouse signals from the personal computer 10 through a VGA monitor signal port 11, a keyboard signal port 12 and a mouse signal port 13, and to encode received VGA monitor signals, keyboard signals and mouse signals into a complex signal, and then to transmit the encoded complex signal to the input end of the decoder 4 through the red, green and blue signal lines 31~33. The decoder 4 receives and decodes the encoded complex signal from the encoder 2 through the signal lines 31~33, and then transmits the decoded VGA monitor signals, keyboard signals and mouse signals to a VGA monitor, a keyboard and a mouse through a VGA video port 51, a keyboard port 52 and a mouse port 53 respectively.

The decoder 4 receives ID signals from the VGA video port 51, keyboard signals from the keyboard port 52 and mouse signals from the mouse port 53, then synthesizes received signals into a complex signal, and then transmits the synthesized complex signal through the D signal line 34 to the encoder 2. Upon receipt of the complex signal from the decoder 4 through the D signal line 34, the encoder 2 immediately decodes the complex signal into corresponding VGA monitor signals, keyboard signals and mouse signals, and then transmits decoded VGA monitor signals, keyboard signals and mouse signals to the computer 10 through the VGA monitor signal port 11, the keyboard signal port 12 and the mouse signal port 13.

Figure 7:
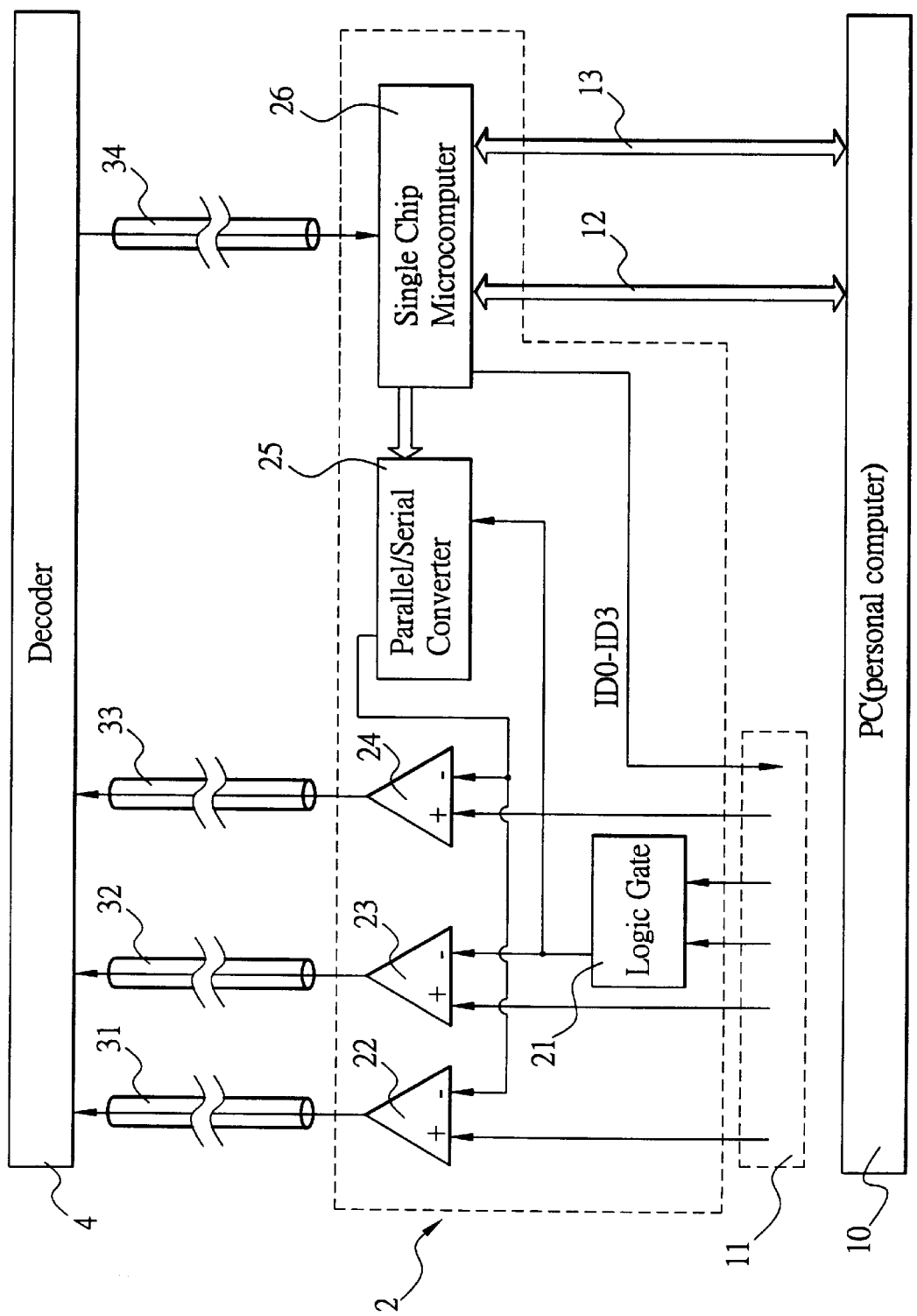
FIG. 7 is a circuit block diagram of the encoder according to the present invention.

Referring to FIG. 7, the encoder 2 encodes VGA monitor signals (horizontal synchronizing signal, vertical synchronizing signal, red video signal, green video signal, blue video signal), keyboard signals (Data, Clock) and mouse signals (Data, Clock) from the personal computer 10, and is comprised of a logic gate 21, a parallel/serial converter 25, a single-chip microcomputer 26, and G.R.B video operational amplifiers 22~24.

Figure 2:
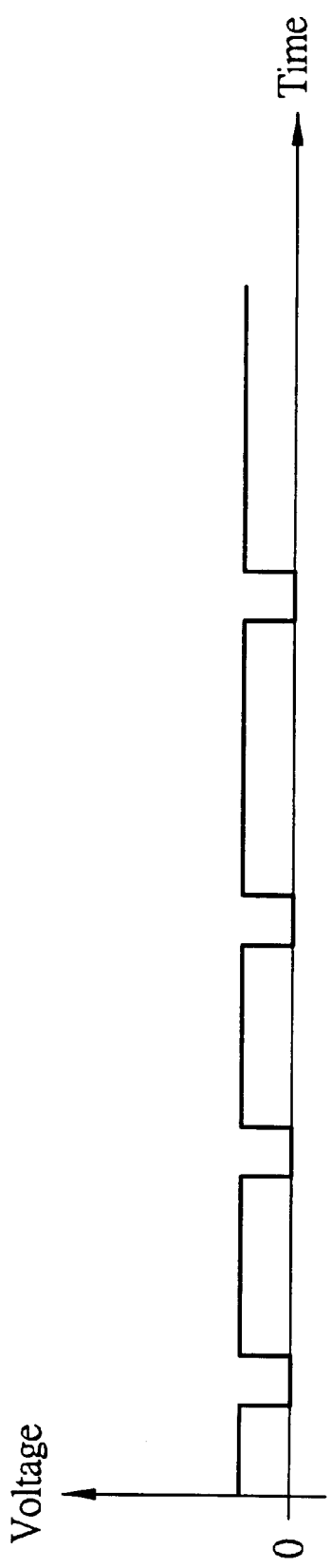
FIG. 2 illustrates the waveform of the horizontal signal from the VGA video port according to the present invention.
Figure 3:
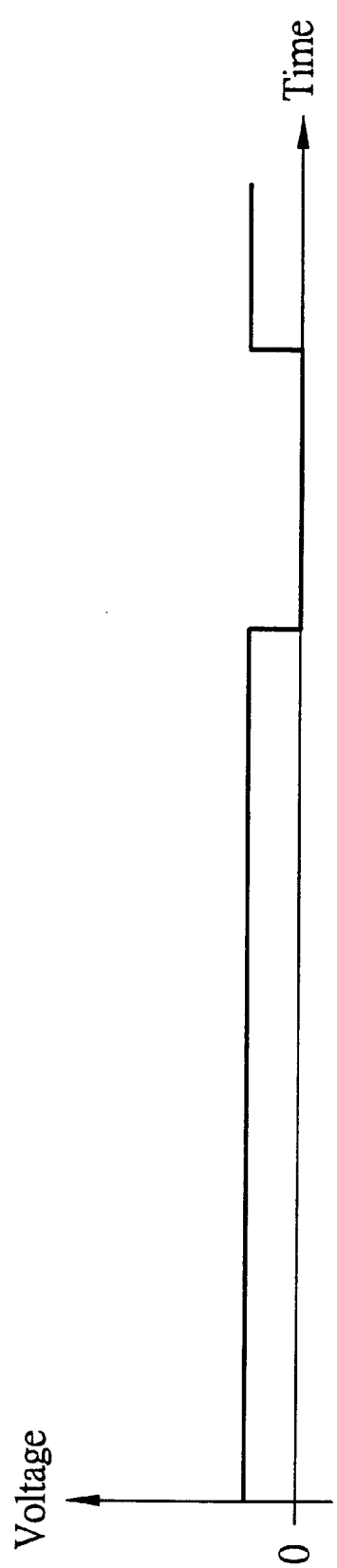
FIG. 3 illustrates the waveform of the vertical signal from the VGA video port according to the present invention.

The logic gate 21 receives horizontal synchronizing signal (see FIG. 2) and vertical synchronizing signal (see FIG. 3) from VGA monitor signals, then synthesizes received horizontal synchronizing signal and vertical synchronizing signal into a complex signal, enabling the synthesized complex signal to be transmitted to the inverter terminal of the G video operational amplifier 23 and the input terminal of the parallel/serial converter 25.

Figure 4:
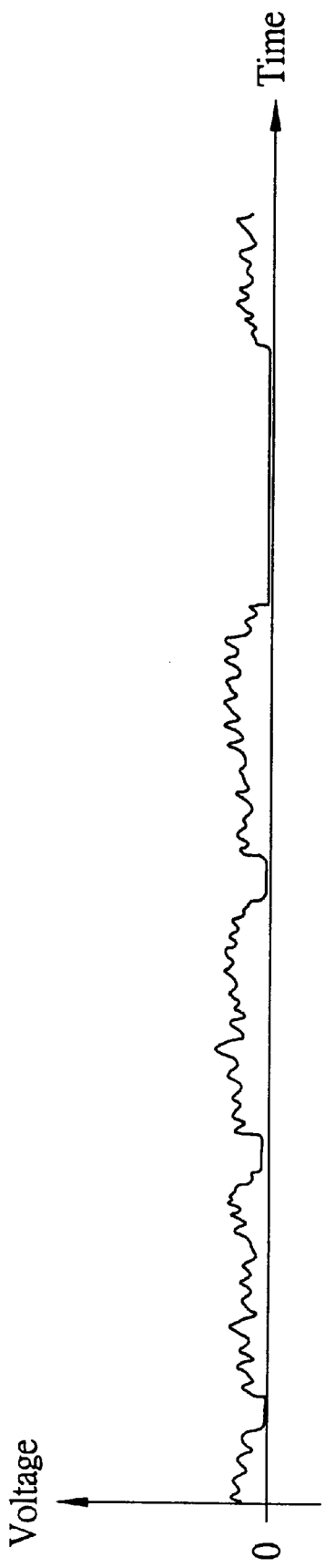
FIG. 4 illustrates the waveform of the video signal from the VGA video port according to the present invention.
Figure 5:
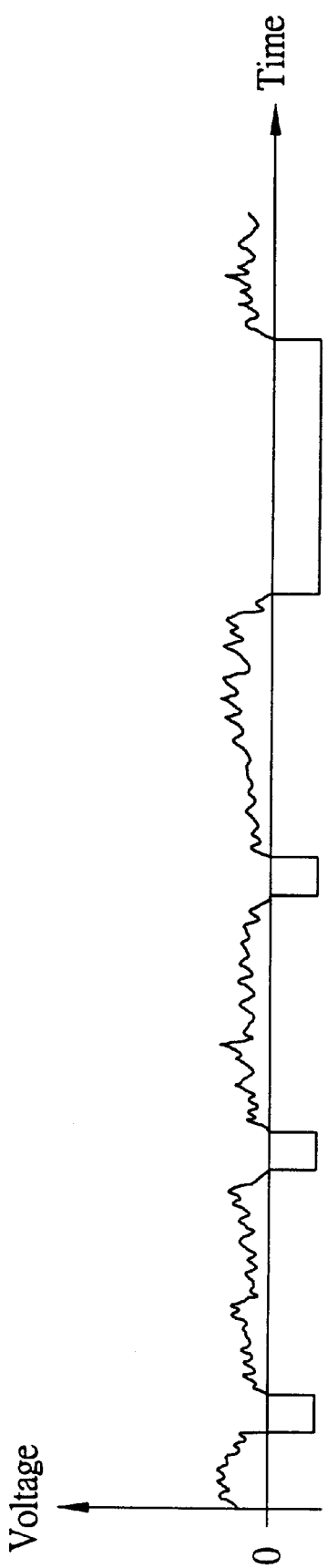
FIG. 5 illustrates the waveform of the output signal from the G video operational amplifier of the encoder according to the present invention.
Figure 6:
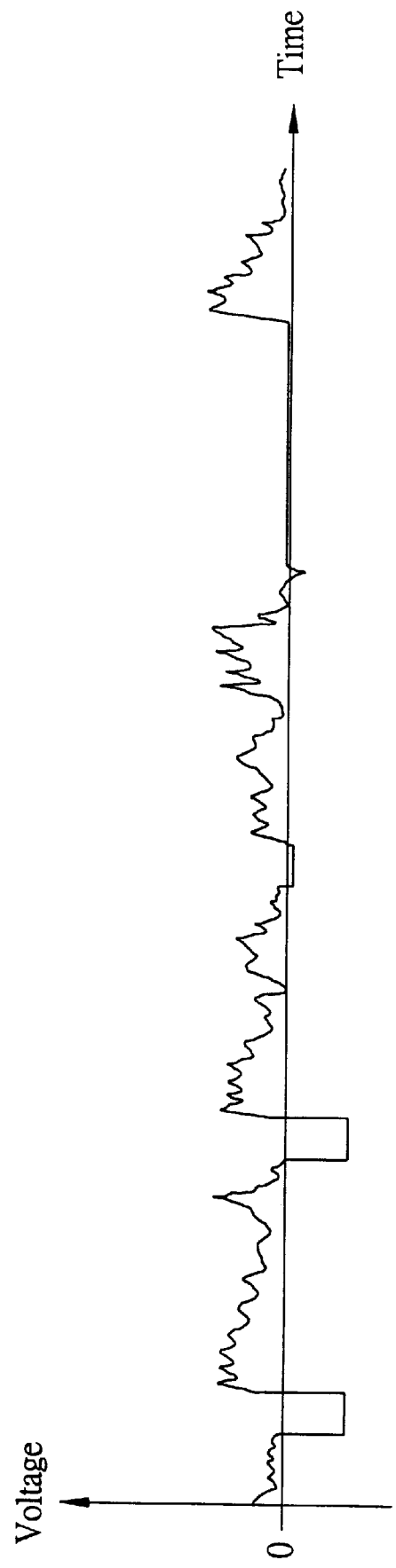
FIG. 6 illustrates the waveform of the output signal from the R/B video operational amplifier according to the present invention.

The parallel/serial converter 25 receives parallel output signal from the single-chip microcomputer 26 and clock signal from the logic gate 21, then converts received parallel data signal into corresponding serial data signal, enabling converted serial data signal to be transmitted to the inverter terminal of the B video operational amplifier 24. The non-inverter terminals of the R.G.B video operational amplifiers 22~24 receives red, green and blue video signals, and the signals at the output terminals of the R.G.B video operational amplifiers 22~24 are respectively transmitted through the red, green and blue signal lines 31~33 to the input end of the decoder 4 (see also FIG. 4). The video operational amplifiers 22~24 respectively amplify signals received from the respective non-inverter terminals, and then send amplified signals through the respective output terminals and the red, green and blue signal lines 31~33 to the non-inverter terminals of respective comparators 41~43 of the decoder 4 (see FIG. 8), and then to input terminals of respective amplifiers 46~48 of the decoder 4. The non-inverter terminals of the comparators 41~43 respectively receive a -0.4V voltage. The output terminals of the comparators 41~43 are connected to a +5V voltage through resistors R1,R2,R3 respectively. The waveform of the amplified output signal from the G video operational amplifier 23 is as shown in FIG. 5. The video signal in this waveform is of positive potential, and the horizontal synchronizing signal as well as the vertical synchronizing signal are of negative potential. The waveform of the amplified output signal from the R video operational amplifier 22/B video operational amplifier 24 is as shown in FIG. 6.

The single chip microcomputer 26 receives and decodes keyboard signals from the keyboard signal port 12 and mouse signals from the mouse signal port 13, then transmits decoded signals to the parallel/serial converter 25 for converting into corresponding serial signals, enabling converted serial signals to be mixed with R video signal from the R operational amplifier 22 or B video signal from B operational amplifier 24. The waveform of the signal at this stage is as shown in FIG. 6, wherein negative voltage is represented by "1", and zero voltage is represented by "0". The single chip microcomputer 26 also receives signals from the D signal line 34, and then sends received VGA signals ID0~ID3, keyboard signals and mouse signals to the personal computer 10 through the VGA monitor signal port 11, the keyboard signal port 12 and the mouse signal port 13.

Figure 8:
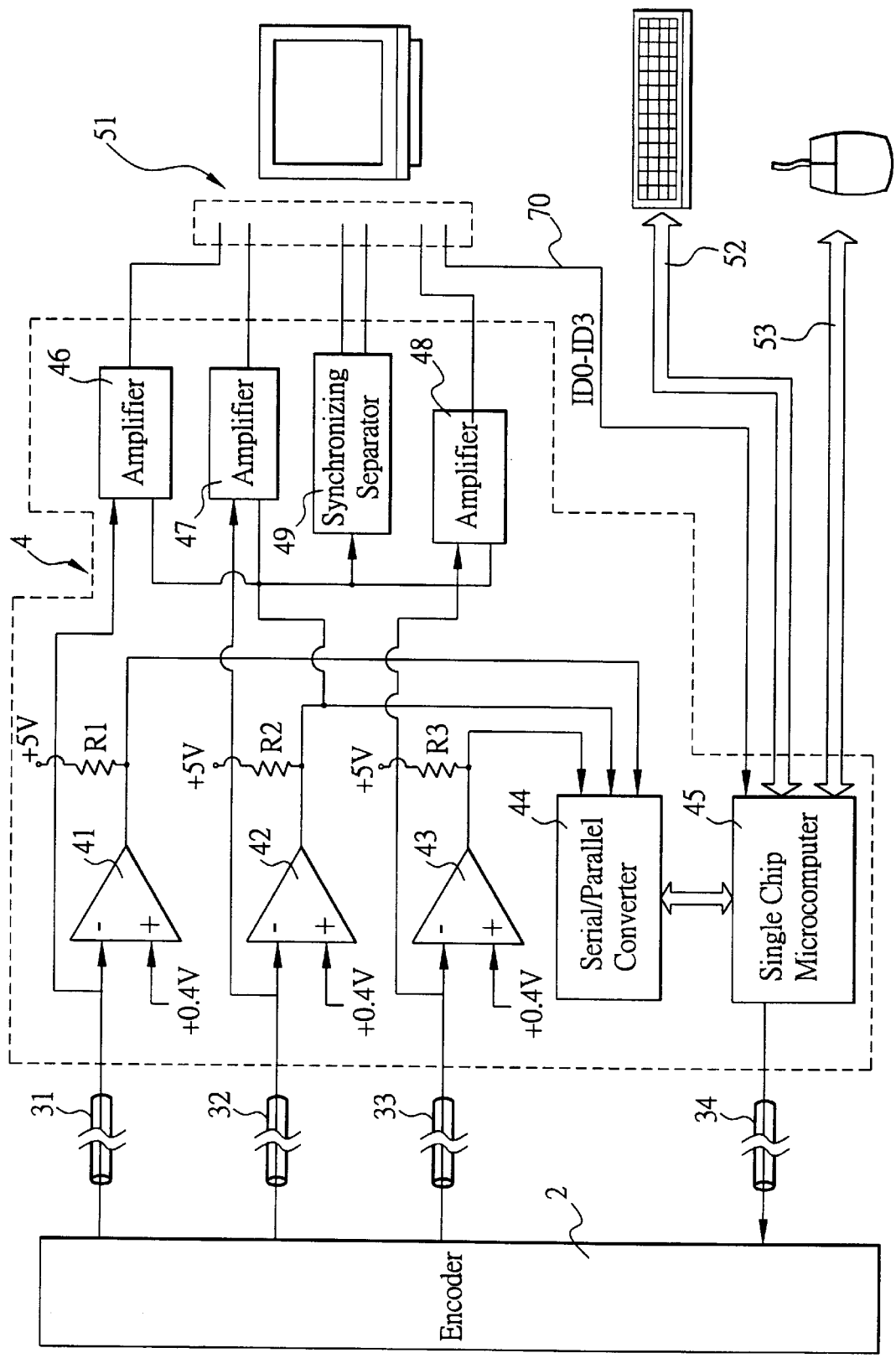
FIG. 8 is a circuit block diagram of the decoder according to the present invention.

Referring to FIG. 8, the decoder 4 is comprised of R.G.B comparators 41~43, a serial/parallel converter 44, a single chip microcomputer 45, a synchronizing separator circuit 49, and R.G.B amplifiers 46~48.

The R.G.B comparators 41~43 receive complex signals transmitted from the encoder 2 through the red, green and blue signal lines 31~33. The green comparator 42 picks up horizontal synchronizing signal and vertical synchronizing signal from the green signal line 32 for providing the serial/parallel converter 44 with clock pulse. The red and blue comparators 41,43 separate digital signals from video signals, and send separated digital signals to the serial/parallel converter 44 for converting into parallel digital signals for the single chip microcomputer 45. The green comparator 42 also sends compared horizontal synchronizing signal and vertical synchronizing signal to the other input terminals of the R.G.B amplifiers 46~48 and the synchronizing separator circuit 49, enabling R.G.B video signals to be returned to their former waveform (see FIG. 4), and horizontal synchronizing signal to be separated from vertical synchronizing signal.

The serial/parallel converter 44 receives the output signal of the G comparator 42, and converts serial data from the output signals of the R.B comparators 41,43 into parallel data, and then sends converted parallel data to the single chip microcomputer.

The single chip microcomputer 45 receives and encodes ID0~ID3 signals 70 of VGA video signal from the remote VGA video port 51, keyboard signals from the keyboard port 52 and mouse signals from the mouse port 53, then sends encoded signals through the D signal line 34 to the input terminal of the single chip microcomputer 26 of the encoder 2. The single chip microcomputer 45 also receives parallel data from the serial/parallel converter 44, then sends received data to the remote keyboard and mouse through the keyboard port 52 and the mouse port 53.

The input terminals of the R.G.B amplifiers 46~48 receive complex signals from the encoder 2 through the R.G.B signal lines 31~33 and the output signal of the G comparator 42. The R.G.B amplifiers 46~48 remove horizontal synchronizing signal, vertical synchronizing signal and digital signal from the received signals to be removed from inputted signals, so as to reduce input signals to output red, green and blue video signals (see FIG. 4), enabling reduced red, green and blue video signals to be sent to the VGA monitor through the VGA video port 51.

The synchronizing separator circuit 49 receives horizontal synchronizing signal and vertical synchronizing signal, then separates received horizontal synchronizing signal from vertical synchronizing signal (see FIGS. 2 and 3), and then picks up separated horizontal synchronizing signal from vertical synchronizing signal, and then sends picked up signals to the VGA monitor through the VGA video port 51.

As indicated above, the invention simply uses VGA monitor's three one-way transmission video signal lines and one one-way transmission signal line to transmit two-way computer keyboard and mouse signals and one-way VGA monitor signals to remote apparatus, enabling the user to operate the computer from a distance.

While only one embodiment of the present invention has been shown and described, it will be understood that various modifications and changes could be made thereunto without departing from the spirit and scope of the invention disclosed (for example, horizontal or vertical synchronizing pulse can be negative pulse or positive pulse; the mouse used can be a RS-232 mouse; in additional to VGA monitor, keyboard and mouse, the remote apparatus may include any other serial/parallel peripheral apparatus).

What the invention claimed is:

1. A computer keyboard, mouse and VGA monitor signal transmission arrangement comprising an encoder connected to a personal computer, a decoder connected to computer peripheral apparatus including a VGA monitor, a keyboard and a mouse, and a set of signal lines connected between said encoder and said decoder for signal transmission, said encoder enabling video horizontal synchronizing and vertical synchronizing signals, keyboard signals and mouse signals to be mixed into either two of the red, green and blue video signals and then transmitted with the mixed video signals through said signal lines to said decoder, said decoder decoding received signals, enabling decoded video horizontal synchronizing and vertical synchronizing signals, keyboard signals and mouse signals to be respectively transmitted to the VGA monitor, the keyboard and the mouse, said decoder transmitting signals from the VGA monitor, the keyboard and the mouse to the personal computer through said signal lines and said encoder, wherein:

said signal lines include a red video signal line, a green video signal line, a blue video signal line, and a D signal transmission signal line;

said encoder receives VGA monitor signals, keyboard signals and mouse signals from the personal computer, encodes received VGA monitor signals, keyboard signals and mouse signals, and then transmits encoded signals to said decoder through said red, green and blue video signal lines;

said encoder receives VGA video ID signals, keyboard signals and mouse signals from said D signal transmission signal line, encodes received signals, and then transmits encoded signals to the personal computer through a VGA monitor signal port, a keyboard signal port and a mouse signal port;

said encoder is comprised of a logic gate, a parallel/serial converter, a single chip microcomputer, and R.G.B video operational amplifiers, said logic gate having an input end for receiving horizontal synchronizing signal and vertical synchronizing signal from VGA monitor signals and an output end connected to an inverter terminal of one video operational amplifier and an input end of said parallel/serial converter;

said parallel/serial converter receives output signal of the single-chip microcomputer of said encoder and complex signal from said logic gate, then outputs converted signal to inverter terminals of the other two video operational amplifiers that are not connected to said logic gate;

said R.G.B video operational amplifiers have respective non-inverter terminals for receiving receive red, green and blue video signals, and respective output terminals respectively connected to said decoder through the red, green and blue signal lines for signal output to said decoder;

the single chip microcomputer of said encoder receives keyboard signals and mouse signals from the personal computer through the keyboard signal port and the mouse signal port, and outputs processed signals to said parallel/serial converter;

the single chip microcomputer of said encoder also receives signals from said decoder through said D signal transmission signal line, and then sends received signals to the personal computer through the VGA monitor signal port, the keyboard signal port and the mouse signal port;

said decoder receives and decodes encoded complex signals from said encoder through said red video signal line, said green video signal line and said blue video signal line, then sends decoded signals to the VGA monitor, the keyboard and the mouse through a VGA video port, a keyboard port and a mouse port;

said decoder receives ID signals from the VGA monitor through the VGA video port, keyboard signals from the keyboard through the keyboard port and mouse signals from the mouse through the mouse port, then synthesizes received signals into a complex signal, and then transmits the synthesized complex signal through said D signal transmission signal line to said encoder;

said decoder is comprised of R.G.B comparators, a serial/parallel converter, a single chip microcomputer, R.G.B amplifiers, and a synchronizing separator circuit;

the R.G.B comparators of said decoder receive video signals from said encoder through said red signal line, said green signal line and said blue signal line, then transmit processed output signals to said serial/parallel converter, and output horizontal synchronizing and vertical synchronizing contained signals to the respectively connected amplifiers and said synchronizing separator circuit;

said serial/parallel converter receives and converts the output signals from the R.G.B comparators of said decoder, and outputs converted signals to the single chip microcomputer of said decoder;

the single chip microcomputer of said decoder receives and encodes ID signals of VGA video signal, keyboard signals and mouse signals from the personal computer, then sends encoded signals through said D signal transmission signal line to the single chip microcomputer of said encoder, and receives parallel data from said serial/parallel converter, then sends received data to the keyboard and the mouse through the keyboard port and the mouse port;

the R.G.B amplifiers of said decoder receive complex signals from said encoder through said red signal line, said green signal line and said blue signal line and horizontal synchronizing and vertical synchronizing contained signal from one comparator of said decoder, and outputs processed signals to the VGA monitor through the VGA video port;

said synchronizing separator circuit receives and separates horizontal synchronizing signal and vertical synchronizing signal, then picks up separated signals, and then sends picked up signals to the VGA monitor through the VGA video port.

\* \* \* \* \*